United States Patent
Lee et al.

(10) Patent No.: US 6,605,135 B2
(45) Date of Patent: Aug. 12, 2003

(54) GRANULAR BED RESTRAINT SYSTEM

(75) Inventors: Sang Kook Lee, Allentown, PA (US); William Thomas Kleinberg, Emmaus, PA (US)

(73) Assignee: Air Products and Chemicals, Inc., Allentown, PA (US)

(*) Notice: Subject to any disclaimer, the term of this patent is extended or adjusted under 35 U.S.C. 154(b) by 0 days.

(21) Appl. No.: 09/963,203

(22) Filed: Sep. 26, 2001

(65) Prior Publication Data

US 2003/0056649 A1 Mar. 27, 2003

(51) Int. Cl.[7] .............................. B01D 53/04
(52) U.S. Cl. .................. 95/90; 96/149; 55/513; 55/518
(58) Field of Search ................ 96/108, 147, 149, 96/150, 152; 95/90, 108; 55/512, 513, 516, 518, 519; 210/266, 283; 422/311

(56) References Cited

U.S. PATENT DOCUMENTS

| | | | |
|---|---|---|---|
| 773,946 A | * 11/1904 | Langill | |
| 1,717,470 A | * 6/1929 | Speidel | |
| 2,961,304 A | * 11/1960 | Collins | 422/217 |
| 3,498,755 A | * 3/1970 | Borre | 422/191 |
| 3,554,377 A | * 1/1971 | Miller | 210/275 |
| 3,996,015 A | * 12/1976 | Hutchings | 422/217 |
| 4,285,910 A | * 8/1981 | Kennedy, Jr. | 261/97 |
| 4,294,699 A | 10/1981 | Herrmann | 210/287 |
| 4,337,153 A | 6/1982 | Prior | 210/288 |
| 4,454,040 A | * 6/1984 | Roberts | 210/283 |
| 4,758,255 A | 7/1988 | Yamada et al. | 55/316 |
| 4,997,465 A | 3/1991 | Stanford | 55/179 |
| 5,486,289 A | 1/1996 | McCullough | 210/289 |
| 5,569,380 A | * 10/1996 | Sullivan | 210/266 |
| 5,769,928 A | * 6/1998 | Leavitt | 95/119 |
| 5,873,929 A | * 2/1999 | Andreani et al. | 422/177 |
| 6,027,548 A | 2/2000 | Ackley et al. | 95/96 |
| 6,129,780 A | 10/2000 | Millet et al. | 95/117 |
| 6,334,889 B1 | * 1/2002 | Smolarek et al. | 96/137 |

FOREIGN PATENT DOCUMENTS

| | | |
|---|---|---|
| DE | 2304990 | 8/1973 |
| DE | 4314953 A1 | * 11/1994 |
| EP | 0719578 | 9/1999 |
| EP | 1080772 | 3/2001 |

OTHER PUBLICATIONS

Norton Denstone 57 Catalyst Bed Supports (No Date).

* cited by examiner

Primary Examiner—Duane Smith
Assistant Examiner—Frank M. Lawrence
(74) Attorney, Agent, or Firm—John M. Fernbacher

(57) ABSTRACT

System for restraining the upward motion of granular material in a vessel containing a bed of the granular material through which a fluid flows in an upward direction. The system comprises flexible porous basket within the vessel in contact with the top of the bed of granular material and in contact with the inner walls of the vessel above the bed of granular material, wherein the porous basket has openings which are smaller than the smallest particles of the granular material such that granular material does not pass through the openings. The system also includes a layer of solid bodies located within the flexible porous basket wherein the solid bodies press the flexible porous basket against the top of the bed of granular material and against the inner walls of the cylindrical vessel above the bed of granular material.

23 Claims, 4 Drawing Sheets

GRANULAR BED RESTRAINT SYSTEM

BACKGROUND OF THE INVENTION

Components in a fluid stream can be converted or removed by contacting the fluid in axial flow with a fixed bed of granular material containing specific substances which physically or chemically interact with the components in the fluid stream. Examples include adsorption processes to separate or purify gases or liquids, catalytic chemical reaction processes, and the removal of contaminants from liquids by ion exchange. In these applications, the granular material can be subjected to considerable hydraulic forces by fluid flowing in an upward direction, which can result in undesirable movement of the granular material.

In a pressure swing adsorption process, for example, an adsorbent bed can be subjected to high gas flow velocities at certain times during each process cycle. The pressure swing adsorption process cycle includes the basic steps of adsorption, depressurization, purge, and repressurization, and also may include pressure equalization and provide purge steps in which gas is transferred from a bed at decreasing pressure to another bed which is at constant or increasing pressure. In certain of these steps, gas flows through the bed in an upward direction, and if the gas flow rate is sufficiently high, bed lifting or adsorbent fluidization can occur.

Bed lifting can occur when a high flow rate of gas is introduced into the bottom of an axial flow bed while little or no gas flows from the top of the bed, for example, during feed repressurization. The forces generated in the bottom portion of the bed as a result of pressure drop can exceed the weight of the bed, thus causing the entire bed to lift.

Fluidization may occur in the upper portion of the bed due to high gas velocity in that part of the bed. This situation can occur during pressure equalization or provide purge steps, for example, in which gas flows from the top of the bed at a high rate while no gas flows into the bottom of the bed. If the pressure drop across the top layer of the bed exceeds the weight of the adsorbent particles, fluidization will occur.

The phenomena of bed lifting and fluidization are undesirable and can adversely affect the integrity of beds of granular material. Bed mixing, channeling, dusting, and material carryover can occur which could require shutdown of the process for corrective maintenance and, in certain cases, could require discharging and refilling of granular material in the vessel. While it is possible to design fluid flow control systems so that upward fluid pressure drop will not cause excessive lifting forces on the granular material, this approach involves some risk that bed lifting and fluidization may still occur due to instrument failure. It is desirable to eliminate such risk by designing the vessels such that bed lifting and fluidization cannot occur. The invention described below and defined in the claims which follow offers specific bed designs which eliminate bed lifting and fluidization in processes which treat fluid streams.

BRIEF SUMMARY OF THE INVENTION

The invention relates to a system for restraining the upward motion of granular material in a vessel containing a bed of the granular material through which a fluid flows in an upward direction. The system comprises:
  (a) a flexible porous basket within the vessel in contact with the top of the bed of granular material and in contact with the inner walls of the vessel above the bed of granular material, wherein the porous basket has openings which are smaller than the smallest particles of the granular material such that granular material does not pass through the openings; and
  (b) a layer of solid bodies located within the flexible porous basket wherein the solid bodies press the flexible porous basket against the top of the bed of granular material and against the inner walls of the cylindrical vessel above the bed of granular material, wherein the solid bodies in the layer of solid bodies have an average diameter greater than the average particle diameter of the granular material and the material forming the solid bodies has a density greater than the bulk density of the granular material.

The granular material may be adsorbent material and the fluid may be a gas. The solid bodies in the layer of solid bodies may be formed of material selected from the group consisting of mineral, ceramic, and metal. The density of the material forming the solid bodies in the layer of solid bodies typically nay be between about 1.5 and about 8 times the bulk density of the granular material. The solid bodies in the layer of solid bodies may comprise ceramic balls.

The average diameter of the solid bodies in the layer of solid bodies may be between about 1.5 and about 3 times the average particle diameter of the granular material. The depth of the layer of solid bodies typically may be between about 3 and about 6 inches.

A plurality of additional solid bodies may be located on top of the layer of solid bodies. The average diameter of these additional solid bodies may be between about 10 and about 50 mm. At least some of these additional solid bodies may be located within the flexible porous basket. The additional solid bodies may be formed of material selected from the group consisting of mineral, ceramic, and metal.

The solid bodies in the layer of solid bodies may be formed of material selected from the group consisting of mineral, ceramic, and metal. These solid bodies in the layer of solid bodies and the additional solid bodies may comprise ceramic balls.

The cylindrical vessel has an upper head and a lower head. At least a portion of the additional solid bodies may be in contact with, and restrained from upward movement by, the upper head of the cylindrical vessel. At least some of the additional solid bodies may be in contact with, and restrained from upward movement by, a perforated strainer assembly which is in contact with the upper head of the cylindrical vessel.

Optionally, at least a portion of the additional solid bodies may be restrained from upward movement by the mechanical application of downward force on the solid bodies in the second layer.

The invention also relates to an adsorber assembly which comprises:
  (a) a cylindrical vessel having an upper head and a lower head;
  (b) fluid inlet and outlet piping means connected to the lower head of vessel and fluid inlet and outlet piping means connected upper head for withdrawing fluid from the vessel;
  (c) a bed of granular adsorbent material which partially fills the vessel;
  (d) a flexible porous basket within the cylindrical vessel in contact with the top of the bed of granular material and with the inner walls of the vessel above the top of the bed of granular material, wherein the porous basket has openings which are smaller than the smallest particles of the granular material such that granular material does not pass through the openings; and (e) a layer of solid bodies located within the flexible porous basket which press the flexible porous basket against the top of the bed of granular material and against the inner walls of the cylindrical vessel above the bed of granular material, wherein the solid bodies in the layer of solid bodies have an average diameter greater than the average particle diameter of the granular material and the material forming the solid bodies has a density greater than the bulk density of the granular material.

In the adsorber assembly, the depth of the layer of solid bodies typically may be between about 3 and about 6 inches. A plurality of additional solid bodies may be located on top of the layer of solid bodies. The average diameter of these additional solid bodies may be between about 10 and about 50 mm.

The adsorber assembly may further comprise a perforated strainer assembly located between the additional solid bodies and the upper head of the cylindrical vessel, wherein at least some of the solid bodies may be in contact with the upper head and the perforated strainer assembly.

The invention also relates to a method for restraining the upward motion of granular material in a vessel having an upper head and a lower head, which vessel contains a bed of granular material through which a fluid flows in an upward direction, wherein the method comprises:

(a) providing a flexible porous basket which has openings with sizes smaller than the smallest particles in the granular material such that granular material does not pass through the openings in the porous basket;

(b) installing the flexible porous basket into the cylindrical vessel in contact with the top of the bed of granular material and against the inner walls of the cylindrical vessel above the top of the bed of granular material; and (c) placing a layer of solid bodies within the flexible porous basket which presses the flexible porous basket against the top of the bed of granular material and against the walls of the cylindrical vessel above the top of the bed of granular material, wherein the solid bodies in the layer of solid bodies have an average diameter greater than the average particle diameter of the granular material. The method may further comprise the additional features of:

(e) placing a plurality of additional solid bodies on top of the layer of solid bodies, wherein the average diameter of the additional solid bodies is between about 10 and about 50 mm; and (f) placing a perforated strainer assembly between the additional solid bodies and the upper head of the cylindrical vessel, wherein at least some of the solid bodies are in contact with the upper head and the perforated strainer assembly.

DETAILED DESCRIPTION OF THE INVENTION

Figure 1:
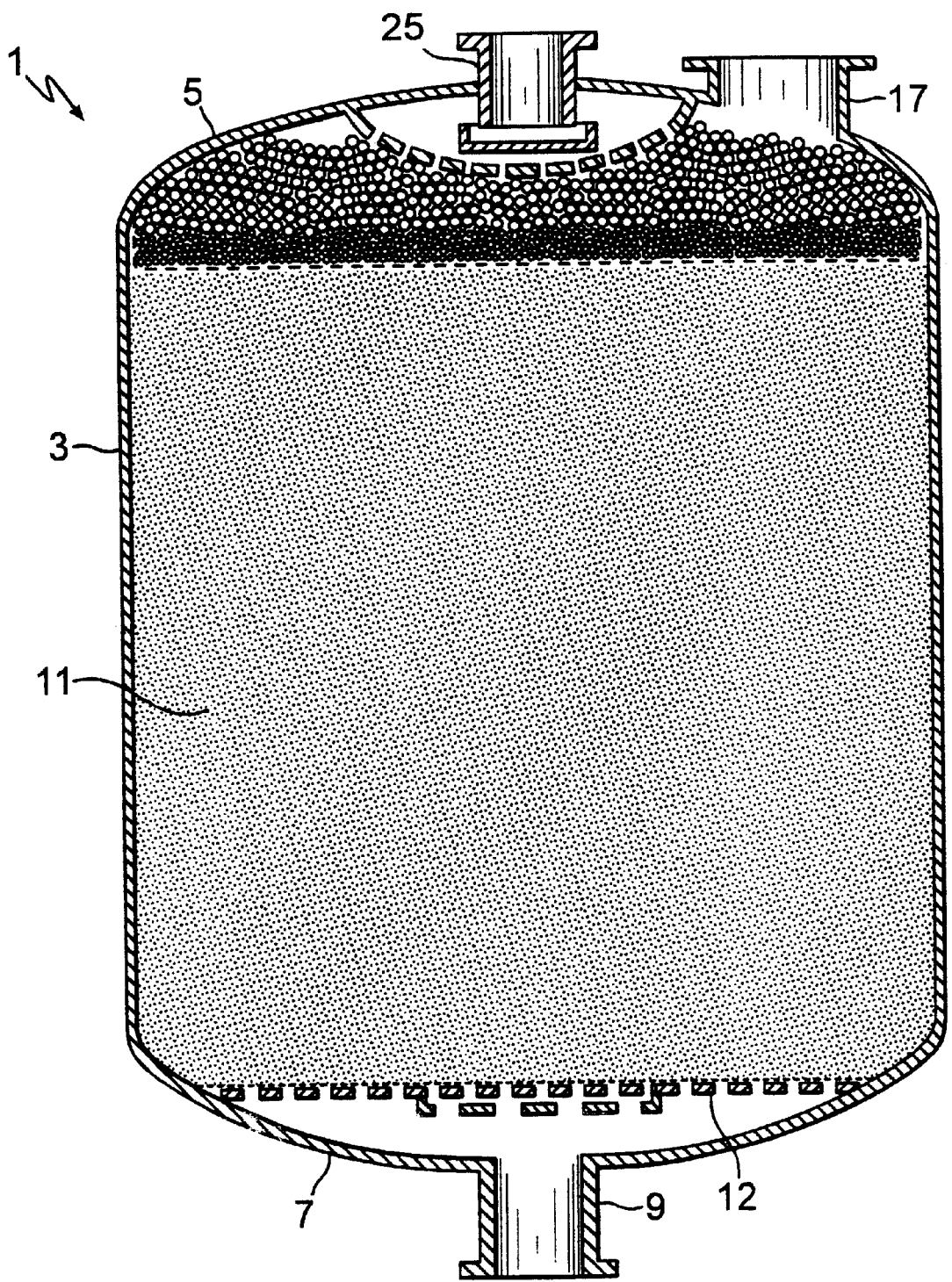
FIG. 1 is a sectional drawing of an exemplary vessel system including the granular bed restraint system of the present invention.

The present invention relates to the design of systems to restrain granular material in axial beds to eliminate bed lifting and fluidization due to upward-flowing fluid. A bed of granular material may be restrained by a flexible porous basket located on the top of the bed and in contact with the inner walls of the vessel which contains the bed. A layer of solid bodies or dense, loose material may be placed within the basket to urge the basket firmly against the top of the bed of granular material and against the inner walls of the vessel above the bed of granular material. A plurality of additional and larger solid bodies or dense, loose material may be placed on top of the first layer of solid bodies to exert downward force on the first plurality of solid bodies.

The flexible porous basket may be fabricated, for example, of woven wire mesh having openings smaller than the smallest individual particles of the granular material so that particles of the granular material do not pass through the basket material. Other materials may be used for the flexible porous basket such as, for example, woven or non-woven fabrics or mats made from metallic, polymeric, or composite metallic/polymeric materials. Exemplary characteristics of the flexible porous basket, regardless of the material from which it is made, are that it typically is sufficiently flexible to insert into an adsorber vessel, typically is inert with respect to the fluid being processed in the granular bed, should have openings or pores smaller than the smallest particles in the granular material so that particles of the granular material do not pass through the basket material, and typically does not impart an unacceptable pressure drop to the fluid flowing through the openings or pores. The side walls of the basket should be of sufficient axial length to enclose or contain a major portion or all of the layer or mass of solid bodies or dense, loose material. The basket should be formed of continuous material and may be made from joined pieces of material having different properties.

The invention relates, in one example, to adsorber bed designs which eliminate adsorbent bed lifting and fluidization in pressure swing adsorption systems. The invention is illustrated by the sectional drawing of FIG. 1, which is an example of a granular bed fluid contacting system used in pressure swing adsorption processes for gas or liquid separation. Adsorber assembly 1 comprises cylindrical vessel 3, upper head 5, and lower head 7. Lower head 7 includes fluid inlet and outlet pipe 9. A bed of granular material 11 is supported by support screen assembly 13, which may be any type of screen known in the art for the support of granular adsorbent or catalyst material. Upper head 5 includes fluid inlet and outlet pipe 15 and manway 17 through which the adsorbent material and bed hold-down device components are installed in the vessel.

The granular material in bed 11 can be any adsorbent material used in a gas or liquid adsorption process. Alternatively, as mentioned earlier, the granular material could be a catalyst used in chemical reaction systems or an ion exchange resin used for fluid treatment.

Figure 2:
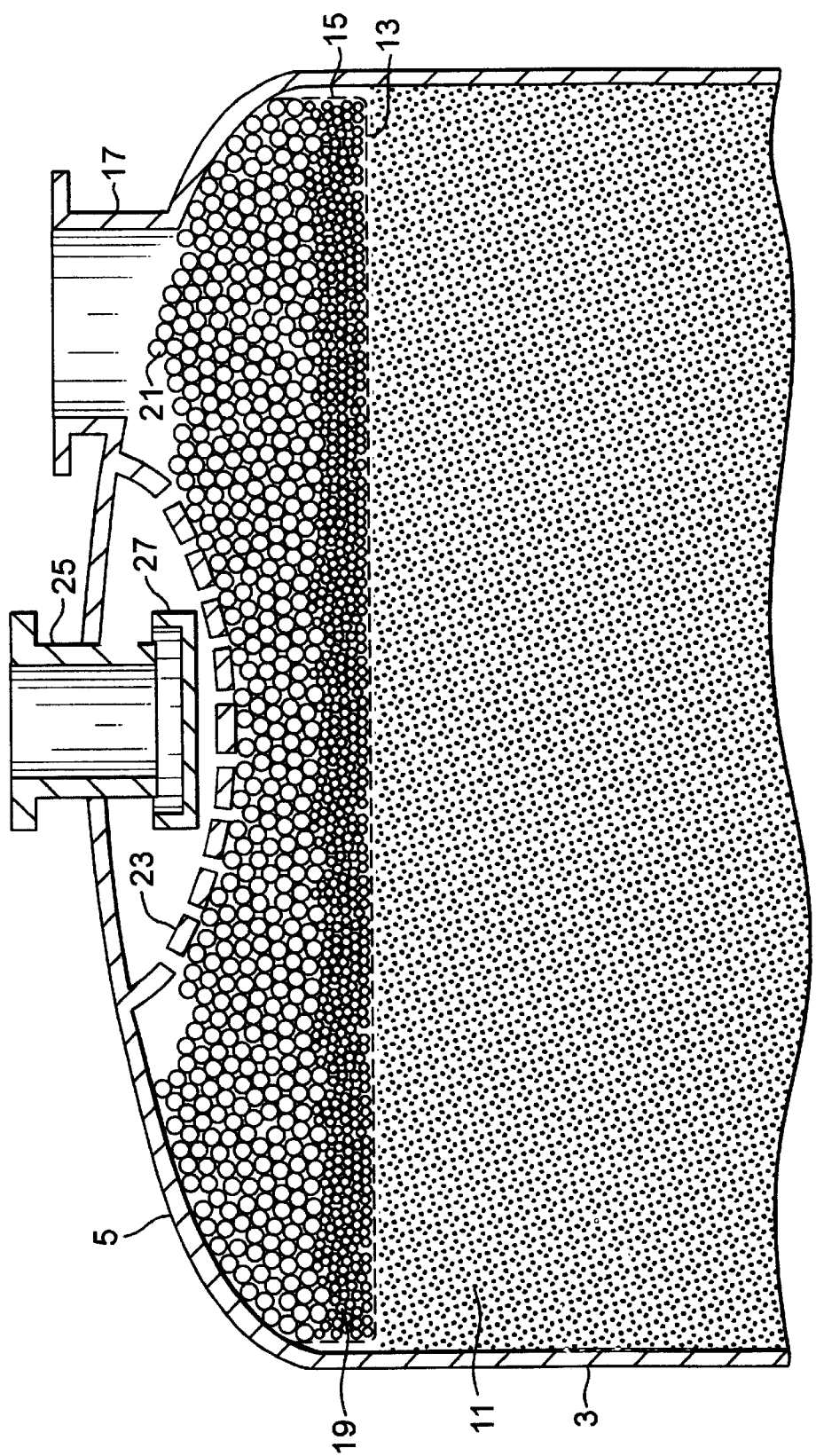
FIG. 2 is an enlarged view of the bed restraint system in FIG. 1.

An enlarged view of the upper portion of adsorber vessel 1 is given in FIG. 2. Flexible porous basket 13, shown here schematically and not to scale, lies in contact with the top of bed 11. Vertical portion 15 of the basket is in contact with the inner surface of the wall of cylindrical vessel 3 above the top of bed 11. The basket material is selected such that the openings in the screen are smaller than the smallest particles in the granular material of bed 11.

The invention relates, in one example, to adsorber bed designs which eliminate adsorbent bed lifting and fluidization in pressure swing adsorption systems. The invention is illustrated by the sectional drawing of FIG. 1, which is an example of a granular bed fluid contacting system used in pressure swing adsorption processes for gas or liquid separation. Adsorber assembly 1 comprises cylindrical vessel 3, upper head 5, and lower head 7. Lower head 7 includes fluid inlet and outlet pipe 9. A bed of granular material 11 is supported by support screen assembly 13, which may be any type of screen known in the art for the support of granular adsorbent or catalyst material. Upper head 5 includes fluid inlet and outlet pipe 25 and manway 17 through which the adsorbent material and bed hold-down device components are installed in the vessel.

The average diameter of the dense, loose material or solid bodies 19 should be greater than the average particle diameter of the granular material and the material forming the solid bodies should have a density greater than the bulk density of the granular material. The bulk density of the dense, loose material or solid bodies 19 may be in the range of about 1.5 to about 8 times the bulk density of the granular material in bed 11. The solid density of the matter from which the dense loose material or solid bodies is made may be about 2.5 to about 13.5 times the bulk density of the granular material in bed 11. The average diameter of individual solid bodies 19 may be about 1.5 to about 3 times the average particle diameter of the granular material in bed 11. The axial depth of the layer of solid bodies 19 may be between about 3 and about 6 inches.

Optionally, an amount of dense, loose material or plurality of solid bodies 21 may be installed on the top of the layer of dense, loose material or solid bodies 19 as shown in FIG. 2. A sufficient amount of solid bodies 21 may be installed so that at least some of the bodies are in direct contact with the inner surface of upper head 5. Dome-shaped perforated strainer assembly 23, which is essentially inflexible, may be attached to the inner surface of upper head 5 and typically may be coaxial with fluid inlet and outlet pipe 25. Solid bodies 21 may be installed so that at least some of the bodies are in direct contact with perforated strainer assembly 23. The contact of solid bodies 21 with upper head 5 and perforated strainer assembly 23 constrains and prevents upward motion of solid bodies 21, solid bodies 19, porous basket 13, and the granular material in bed 11.

Solid bodies 21 may be selected from stones or gravel, packing material such as extruded or cylindrical objects, or solid balls. Solid bodies 21 for this application may be, for example ceramic balls or cylindrical pellets such as those sold by the Norton Chemical Product Division under the name Denstone 57. Alternatively, steel or other metal balls could be used.

Optionally, at least some of the solid bodies 21 may be restrained from upward movement by the mechanical application of downward force by appropriate means on the solid bodies in the second layer. One means of applying such forces can be by pistons located within nozzles (not shown) in upper head 5 activated by springs or gas pressure.

Typically, the average diameter of solid bodies 21 may be between about 10 and about 50 mm. The holes in perforated strainer assembly 23 preferably are smaller than the average diameter of solid bodies 21.

The granular material in bed 11, porous basket 13, and the dense, loose material which comprises solid bodies 19 and 21 may be introduced readily through manway 17 into the interior of the vessel. Flow baffle 27 may be attached to upper head 5 or to fluid inlet and outlet pipe 25 by means of brackets (not shown) and serves to distribute fluid flowing into perforated strainer assembly 23. Solid bodies 19 and 21 also serve to distribute fluid evenly into bed 11 during downward fluid flow and withdraw fluid evenly from bed 11 during upward fluid flow.

Figure 3:
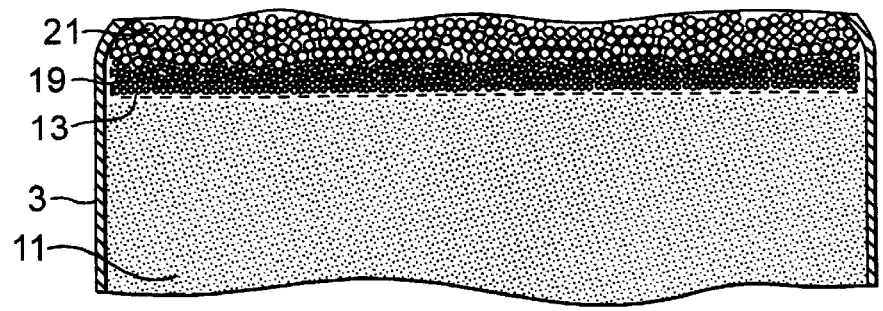
FIG. 3 is a schematic illustration of the flexible porous basket, the adjacent granular bed, and the adjacent layers shown in FIGS. 1 and 2.
Figure 4:
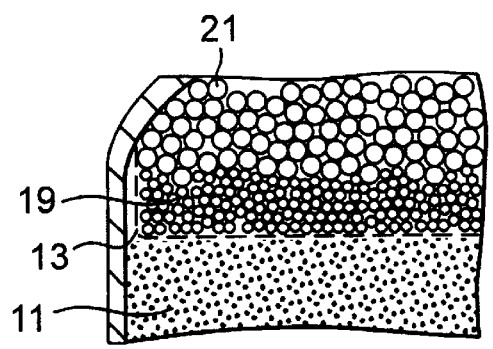
FIG. 4 is an enlarged view of a portion of the flexible porous basket, the adjacent granular bed, and the adjacent layers of FIG. 3.

An alternative section of adsorber assembly 1 is shown schematically (not to scale) in FIG. 3. Flexible porous basket 13 is illustrated between the layer of solid bodies 19 and the top of bed 11 and between the layer of solid bodies 19 and the inner wall of vessel 3 above the top of bed 11. The size and density of solid bodies 19 may be selected in the ranges described earlier so that flexible porous basket 13 is pressed or urged tightly against the top surface of the granular material in bed 11 and also tightly against the inner wall of vessel 3. This latter contact can prevent small particles of the granular material in bed 11 from passing between the screen and wall under conditions of high gas flow. The plurality of solid bodies 21, which are larger than solid bodies 19, exert a downward force on solid bodies 19. A least a portion of solid bodies 21 may be contained within flexible porous basket 13, and if so also would provide additional force outward against flexible porous basket 13 and the wall of vessel 3. FIG. 4 illustrates an enlarged section of FIG. 3 to show more clearly the components of bed 11, flexible porous basket 13, solid bodies 19, and solid bodies 21.

Figure 5:
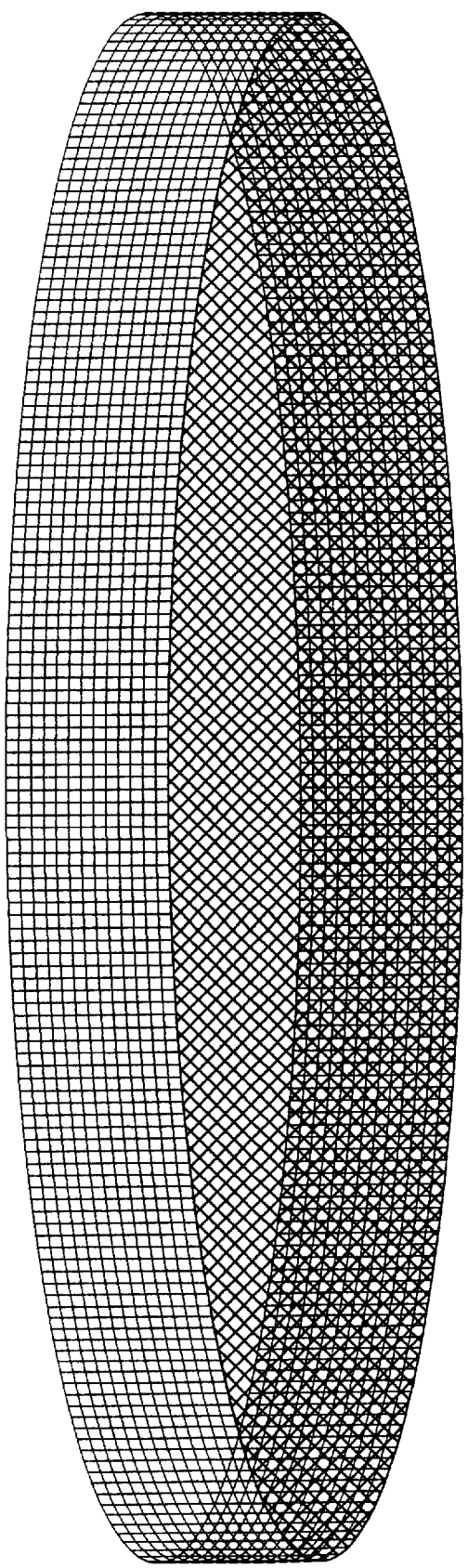
FIG. 5 is an isometric illustration of the flexible porous basket.

Flexible porous basket 13 is illustrated in isometric view (not to scale) in FIG. 5. The diameter of the basket preferably may be about 0.25 to 1.0 inch greater than the inner diameter of the vessel into which it will be installed. The height of the basket may be greater than the depth of the layer of solid bodies 19 and may extend adjacent to the plurality of solid bodies 21 as shown in FIGS. 3 and 4. The height to diameter ratio of the basket typically is between about 0.03 and about 0.10, but other ratios may be used as required.

The flexible porous basket may be fabricated, for example, of woven wire mesh having openings smaller than the smallest individual particles of the granular material. Other materials may be used for the flexible porous basket such as, for example, woven or non-woven fabrics or mats made from metallic, polymeric, or composite metallic/polymeric materials. Desirable characteristics of the flexible porous basket, regardless of the material from which it is made, are that it should be sufficiently flexible, should be inert with respect to the fluid being processed in the granular bed, should have openings or pores smaller than the smallest particles in the granular material, and should not impart an unacceptable pressure drop to the fluid flowing through the openings or pores. The side walls of the basket should of sufficient axial length to enclose or contain a major portion or all of the first layer or mass of solid bodies or dense, loose material. The basket should be formed of continuous material and may be made from joined pieces of material having different properties.

Figure 6:
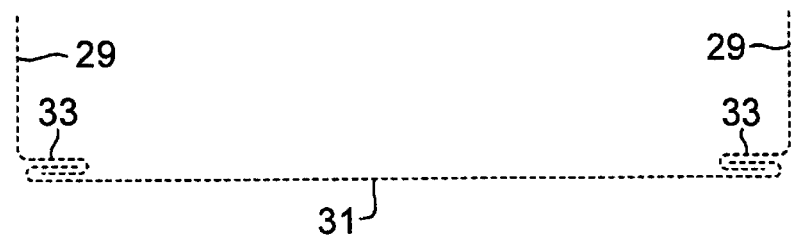
FIG. 6 is a sectional illustration showing a fabrication method for the flexible porous basket.

An exemplary method to fabricate flexible porous basket 13 is illustrated (not to scale) in FIG. 6. First, a cylinder is formed of selected screen material wherein the cylinder diameter is about 0.25 to about 1.0 inch greater than the inner diameter of the vessel into which it will be installed, and is about 2 to 4 inches greater than the desired vertical height of the completed basket. To accomplish this, a piece of screen material of the appropriate dimension is formed into a cylindrical shape and the edges are joined in a by an appropriate method such as spot welding or brazing. A flat circular piece of appropriate screen material is prepared with a diameter approximately equal to the diameter of the cylinder described above. The bottom portion of the screen cylinder is folded as shown in wall section 29 and the edges of the circular piece of screen are folded as shown in element 31 to form lock seam 33. The adjacent portions of screen in lock seam 33 then are joined by an appropriate method such as spot welding or brazing to complete the flexible porous basket. Other fabrication methods can be used if desired.

The completed flexible porous basket can be installed in adsorber vessel 1 by rolling the basket into a small bundle, moving the bundle through manway 17, and carefully unfolding the bundled basket and placing it on the top surface of bed 11. Solid bodies 19 and solid bodies 21 then can be installed in sequence in the head area of adsorber vessel 1.

The installed porous basket and solid bodies as shown in FIGS. 1 and 2, by virtue of the downwardly-exerted weight of these combined elements, prevent fluidization of solid adsorbent material at the top of bed 11. In addition, the installed screen basket and solid bodies, by virtue of their downwardly-exerted weight and also by contact of solid bodies 21 with portions of upper head 5 and perforated strainer assembly 23, prevent upward movement of the entire bed 11 when subjected to high forces caused by gas pressure drop under high upward gas flow conditions.

EXAMPLE

The invention is illustrated but not limited by the following Example. An adsorber vessel is constructed according to FIG. 1 having an inside diameter of 4600 mm and a bed 11 with a depth of 1000 mm. The bed contains granular molecular sieve adsorbent material having an average particle size of 1.4 mm. The adsorbent material has two layers—a bottom layer of 13× type zeolite and a top layer of lithium-exchanged LSX type zeolite. A flexible porous basket such as that shown in FIG. 5 is made of stainless steel screen by the method described above with reference to FIG. 6. Wall section 29 is fabricated from 30 mesh screen made of wire having a diameter of 0.0065 inch. The bottom of the basket formed from element 31 is fabricated of 38×40 mesh asymmetric screen made of wire having a diameter of 0.0075 inch. Lock seam 33 is completed by spot welding on 13 mm centers (nominally ½ inch). The diameter of the completed screen basket is 4625 mm and the sidewall height is 250 mm.

The porous basket is installed on the surface of bed 11 and is filled to a depth of 100 mm (nominally 4 inch) with 3 mm (nominally ⅛ inch) diameter Denstone 57 ceramic balls. A mass of 25 mm (nominally 1 inch) diameter Denstone 57 ceramic balls is installed on top of the 3 mm balls such that the 25 mm balls are in contact with at least a portion of upper head 5 and perforated strainer assembly 23 of adsorber assembly 1.

The bed restraint system of the present invention is a simple and effective method to eliminate bed lifting and fluidization in beds of granular material subjected to upward fluid flow. The flexible porous basket does not require fabrication to close dimensional tolerances, and may be installed easily on the top of the bed within the vessel containing the bed. The basket, by virtue of its flexibility, can be pressed firmly against the inner walls of the vessel and against the top surface of the bed by the layer of dense, loose material or solid bodies which fill the basket. This can prevent fluidization in the top of the bed and form a very effective seal to prevent small particles of the granular material from escaping the vessel. The optional use of larger solid bodies in contact with the top of the layer of smaller solid bodies and also in contact with the head and perforated strainer assembly in the upper part of the vessel can prevent lifting of the entire bed due to high upward fluid flow rates.

What is claimed is:

1. A system for restraining the upward motion of granular material in a cylindrical vessel containing a bed of the granular material through which a fluid flows in an upward direction, wherein the system comprises:

(a) a flexible porous basket within the vessel in contact with the top of the bed of granular material and in contact with the inner walls of the vessel above the bed of granular material, wherein the porous basket has openings which are smaller than the smallest particles of the granular material such that granular material does not pass through the openings; and (b) a layer of solid bodies located within the flexible porous basket wherein the solid bodies press the flexible porous basket against the top of the bed of granular material and against the inner walls of the cylindrical vessel above the bed of granular material, wherein the solid bodies in the layer of solid bodies have an average diameter greater than the average particle diameter of the granular material and the material forming the solid bodies has a density greater than the bulk density of the granular material.

2. The system of claim 1 wherein the granular material is adsorbent material and the fluid is a gas.

3. The system of claim 1 wherein solid bodies in the layer of solid bodies are formed of material selected from the group consisting of mineral, ceramic, and metal.

4. The system of claim 3 wherein the density of the material forming the solid bodies in the layer of solid bodies is between about 1.5 and about 8 times the bulk density of the granular material.

5. The system of claim 3 wherein the solid bodies in the layer of solid bodies comprise ceramic balls.

6. The system of claim 3 wherein the average diameter of the solid bodies in the layer of solid bodies is between about 1.5 and about 3 times the average particle diameter of the granular material.

7. The system of claim 3 wherein the depth of the layer of solid bodies is between about 3 and about 6 inches.

8. The system of claim 1 which further comprises a plurality of additional solid bodies in a second layer located on top of the layer of solid bodies.

9. The system of claim 8 wherein the average diameter of the additional solid bodies is between about 10 and about 50 mm.

10. The system of claim 8 wherein at least some of the additional solid bodies are located within the flexible porous basket.

11. The system of claim 8 wherein solid bodies in the layer of solid bodies are formed of material selected from the group consisting of mineral, ceramic, and metal.

12. The system of claim 11 wherein the additional solid bodies are formed of material selected from the group consisting of mineral, ceramic, and metal.

13. The system of claim 11 wherein solid bodies in the layer of solid bodies and the additional solid bodies comprise ceramic balls.

14. The system of claim 8 wherein the cylindrical vessel has an upper head and a lower head and wherein at least a portion of the additional solid bodies are in contact with, and are restrained from upward movement by, the upper head of the cylindrical vessel.

15. The system of claim 14 wherein at least some of the additional solid bodies are in contact with, and are restrained from upward movement by, a perforated strainer assembly which is in contact with the upper head of the cylindrical vessel.

16. The system of claim 14 wherein at least a portion of the additional solid bodies are restrained from upward movement by the mechanical application of downward force on the solid bodies in the second layer.

17. An adsorber assembly which comprises:
   (a) a cylindrical vessel having an upper head and a lower head;
   (b) fluid inlet and outlet piping means connected to the lower head of vessel and fluid inlet and outlet piping means connected to the upper head for withdrawing fluid from the vessel;
   (c) a bed of granular adsorbent material which partially fills the vessel;
   (d) a flexible porous basket within the cylindrical vessel in contact with the top of the bed of granular material and with the inner walls of the vessel above the top of the bed of granular material, wherein the porous basket has openings which are smaller than the smallest particles of the granular material such that granular material does not pass through the openings; and
   (e) a layer of solid bodies located within the flexible porous basket which press the flexible porous basket against the top of the bed of granular material and against the inner walls of the cylindrical vessel above the bed of granular material, wherein the solid bodies in the layer of solid bodies have an average diameter greater than the average particle diameter of the granular material and the material forming the solid bodies has a density greater than the bulk density of the granular material.

18. The adsorber assembly of claim 17 wherein the depth of the layer of solid bodies is between about 3 and about 6 inches.

19. The adsorber assembly of claim 17 which further comprises a plurality of additional solid bodies located on top of the layer of solid bodies.

20. The adsorber assembly of claim 19 wherein the average diameter of the additional solid bodies is between about 10 and about 50 mm.

21. The adsorber assembly of claim 19 which further comprises a perforated strainer assembly located between the additional solid bodies and the upper head of the cylindrical vessel, wherein at least some of the solid bodies are in contact with the upper head and the perforated strainer assembly.

22. A method for restraining the upward motion of granular material in a vessel having an upper head and a lower head, which vessel contains a bed of granular material through which a fluid flows in an upward direction, wherein the method comprises:
   (a) providing a flexible porous basket which has openings with sizes smaller than the smallest particles in the granular material such that granular material does not pass through the openings in the porous basket;
   (b) installing the flexible porous basket into the cylindrical vessel in contact with the top of the bed of granular material and against the inner walls of the cylindrical vessel above the top of the bed of granular material; and
   (c) placing a layer of solid bodies within the flexible porous basket which presses the flexible porous basket against the top of the bed of granular material and against the walls of the cylindrical vessel above the top of the bed of granular material, wherein the solid bodies in the layer of solid bodies have an average diameter greater than the average particle diameter of the granular material.

23. The method of claim 22 which further comprises:
   (d) placing a plurality of additional solid bodies on top of the layer of solid bodies, wherein the average diameter of the additional solid bodies is between about 10 and about 50 mm; and
   (e) placing a perforated strainer assembly between the additional solid bodies and the upper head of the cylindrical vessel, wherein at least some of the solid bodies are in contact with the upper head and the perforated strainer assembly.

* * * * *